United States Patent
Matsumoto et al.

(10) Patent No.: US 9,224,546 B2
(45) Date of Patent: Dec. 29, 2015

(54) BRAKE DRIVE CONTROLLING DEVICE FOR PROMPTLY SWITCHING STATE OF BRAKE FROM RELEASED STATE TO FASTENED STATE

(71) Applicant: FANUC CORPORATION, Minamitsuru-gun, Yamanashi (JP)

(72) Inventors: Yasuyuki Matsumoto, Yamanashi (JP); Naoyuki Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 237 days.

(21) Appl. No.: 14/074,837

(22) Filed: Nov. 8, 2013

(65) Prior Publication Data

US 2014/0125149 A1  May 8, 2014

(30) Foreign Application Priority Data

Nov. 8, 2012 (JP) ................................. 2012-246302

(51) Int. Cl.
*H01H 9/00* (2006.01)
*H02P 3/02* (2006.01)

(52) U.S. Cl.
CPC ................. *H01H 9/00* (2013.01); *H02P 3/025* (2013.01); *Y10T 307/76* (2015.04)

(58) Field of Classification Search
None
See application file for complete search history.

(56) References Cited

U.S. PATENT DOCUMENTS

| 5,247,140 A | * | 9/1993 | Iwasa et al. | 187/288 |
| 6,154,422 A | * | 11/2000 | Shinkawa et al. | 368/204 |
| 8,126,593 B2 | * | 2/2012 | Watanabe et al. | 700/245 |

FOREIGN PATENT DOCUMENTS

| JP | 07-328966 A | 12/1995 |
| JP | 9272664 A | 10/1997 |
| JP | 2001146366 A | 5/2001 |
| JP | 200914196 A | 1/2009 |

* cited by examiner

*Primary Examiner* — Rexford Barnie
*Assistant Examiner* — Aqeel Bukhari
(74) *Attorney, Agent, or Firm* — Hauptman Ham, LLP

(57) ABSTRACT

A diode includes an anode connected to the other ends of brake coils, and a cathode connected to one end of a smoothing capacitor. A diode includes an anode connected to the other end of the smoothing capacitor, and a cathode connected to one ends of the brake coils. By providing the diodes, energy stored in the brake coils, when at least one of an NPN type transistor and an NPN type transistor is in an on-state, is returned to the smoothing capacitor when the NPN type transistors are in an off-states.

2 Claims, 2 Drawing Sheets

BRAKE DRIVE CONTROLLING DEVICE FOR PROMPTLY SWITCHING STATE OF BRAKE FROM RELEASED STATE TO FASTENED STATE

RELATED APPLICATIONS

The present application is based on and claims priority to Japanese Application Number 2012-246302, filed Nov. 8, 2012, the disclosure of which is hereby incorporated by reference herein in its entirety.

FIELD OF THE INVENTION

The present invention relates to a brake drive controlling device, and in particular to a brake drive controlling device for promptly switching a brake from a released state to a fastened state.

BACKGROUND OF THE INVENTION

An industrial robot or the like including a gravity axis uses a brake drive controlling device that controls a brake braking a driven body such as an arm to prevent the driven body from dropping at the time of stopping a motor.

Such a conventional brake drive controlling device controls drive of the brake by electric power stored in a direct current (DC) link unit connected to an alternating current (AC) power supply via a converter (for example, Patent Literature 1).

Patent Literature 1: JP-A-7-328966

However, the following problem exists in the conventional brake drive controlling device. Namely, at least either influence of energy stored in the brake, or influence of fluctuation in a voltage between both ends of the brake due to fluctuation in a voltage of the DC link unit caused by acceleration, deceleration, or the like of the motor sometimes hinders the brake from being promptly switched from a released state to a fastened state.

An object of the present invention is to provide a brake drive controlling device capable of promptly switching a brake from a released state to a fastened state.

SUMMARY OF THE INVENTION

A brake drive controlling device according to one embodiment is a brake drive controlling device that controls drive of a brake by electric power stored in a DC link unit connected to an AC power supply via a converter, for switching the brake from a released state to a fastened state by stopping a brake drive current flowing in the brake that brakes a driven body driven in a gravity axis direction by a motor, the brake drive controlling device including: a first switching device that is connected to one end of the brake wherein a switch command is input to the first switching device so that a state of the first switching device is switched from an off-state to an on-state to cause a brake drive current to flow in the brake; a second switching device that is connected to the other end of the brake wherein the switch command is input to the second switching device so that a state of the second switching device is switched from an off-state to an on-state to cause a brake drive current to flow in the brake; a first rectifying device, one end being connected to the other end of the brake, and the other end being connected to one end of the DC link unit; and a second rectifying device, one end being connected to the other end of the DC link unit, and the other end being connected to the one end of the brake, wherein when the first switching device and the second switching device are in the off-states, at least either the first rectifying device or the second rectifying device returns, to the DC link unit, energy that is stored in the brake when at least either the first switching device or the second switching device is in the on-state.

Preferably, the brake drive controlling device according to another embodiment further includes: a voltage detecting unit for detecting a brake voltage that is being applied to the brake; and a voltage controlling unit for controlling the brake voltage such that the brake voltage does not fluctuate in accordance with fluctuation in a voltage of the DC link unit.

Preferably, the brake drive controlling device according to still another embodiment further includes: a third rectifying device that prevents a flow of energy between the brake and at least one different brake that are connected in parallel with each other, wherein the flow is caused by a difference in counter electromotive force between the brake and the at least one different brake.

According to the present invention, the brake drive controlling device capable of promptly switching a brake from a released state to a fastened state can be provided.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
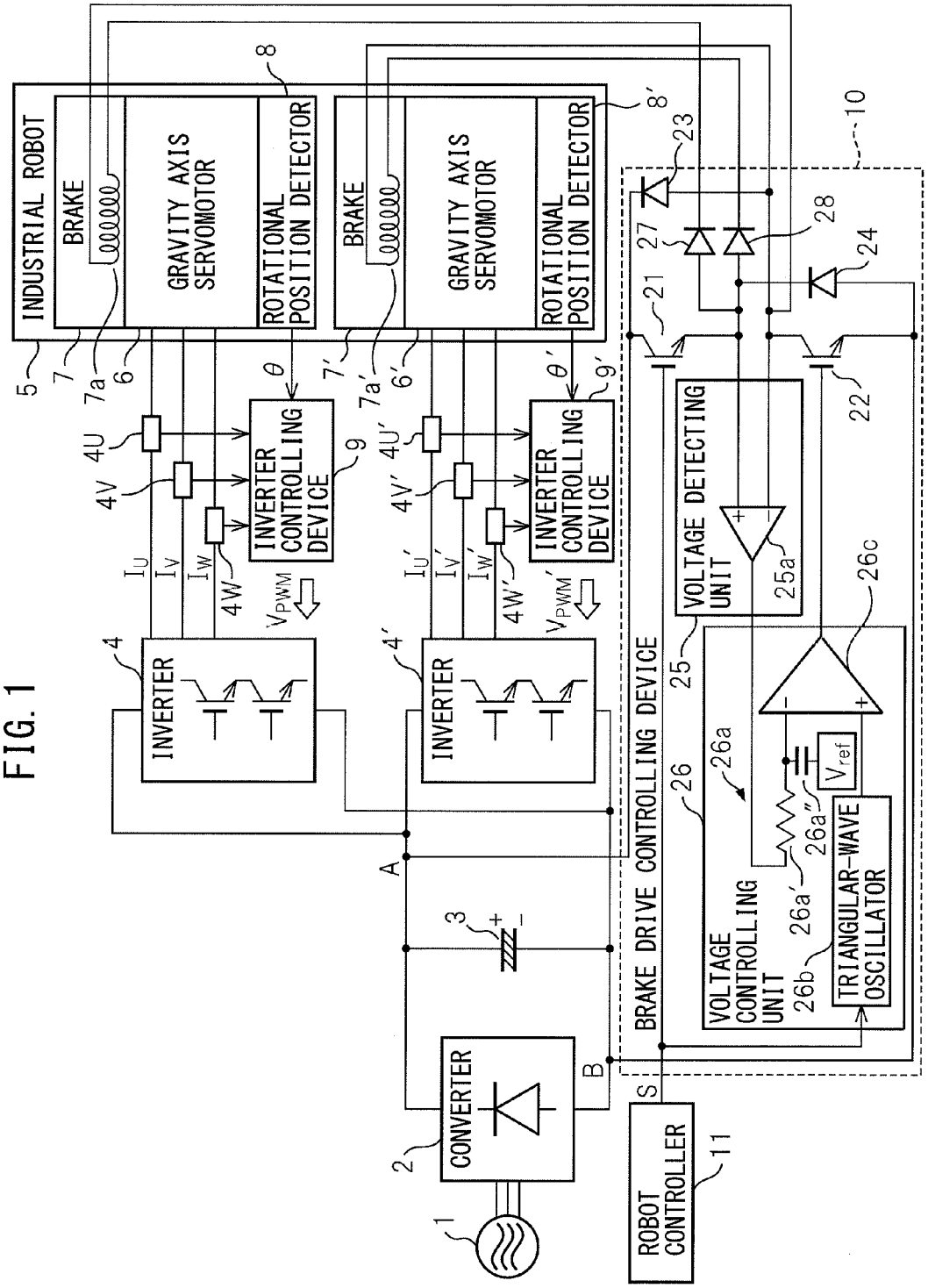
FIG. 1 is a block diagram of a system to which a brake drive controlling device according to the present invention is applied.

A brake drive controlling device according to one embodiment is described with reference to the drawings. FIG. 1 is a block diagram of a system to which the brake drive controlling device according to the present embodiment is applied. The system illustrated in FIG. 1 is used in an industrial robot, and includes a three-phase AC power supply 1 as an AC power supply, a converter 2, a smoothing capacitor 3, inverters 4 and 4', gravity axis servomotors 6 and 6' included in the industrial robot 5, brakes 7 and 7', rotational position detectors 8 and 8', inverter controlling devices 9 and 9', the brake drive controlling device 10, and a robot controller 11.

The converter 2 is constituted, for example, by a plurality of (six in the case of three-phase AC) rectifier diodes. The converter 2 converts, into DC power, AC power supplied from the three-phase AC power supply 1. The smoothing capacitor 3 is connected in parallel with the converter 2 to smooth a voltage rectified by the rectifier diodes of the converter 2. The inverter 4 is connected in parallel with the smoothing capacitor 3. The inverter 4 is constituted, for example, by a plurality of (six in the case of three-phase AC) transistors. The inverter 4 performs on-off operation of the transistors on the basis of a PWM signal $V_{PWM}$ described later to invert, into AC power, DC power converted by the converter 2. The inverter 4' is connected in parallel with the smoothing capacitor 3. The inverter 4' is constituted, for example, by a plurality of (six in the case of three-phase AC) transistors. The inverter 4' performs on-off operation of the transistors on the basis of a PWM signal $V_{PWM}'$ described later to invert, into AC power, DC power converted by the converter 2.

The industrial robot 5 includes a plurality of arms (not shown in the drawing). The gravity axis servomotor 6 is driven by electric power stored in the smoothing capacitor 3 to drive one arm of a plurality of the arms of the industrial robot 5 in a gravity axis direction (Z axis direction). The gravity axis servomotor 6' is driven by electric power stored in the smoothing capacitor 3 to drive, in a gravity axis direction (Z axis direction), another arm that is included in a plurality of the arms of the industrial robot 5 and that is different from the one arm driven by the gravity axis servomotor 6.

The brake 7 causes a brake drive current to flow at the time of driving the gravity axis servomotor 6, to drive the corresponding arm in the gravity axis direction. Thereby, the brake 7 switches the brake 7 from a fastened state to a released state. Meanwhile, the brake 7 stops the brake drive current flowing in the brake 7, at the time of stopping the gravity axis servomotor 6, to brake the corresponding arm for preventing the corresponding arm from dropping. Thereby, the brake 7 switches the brake 7 from the released state to the fastened state. For such a purpose, the brake 7 includes a brake coil 7a through which the brake drive current flows.

The brake 7' causes a brake drive current to flow at the time of driving the gravity axis servomotor 6', to drive the corresponding arm in the gravity axis direction. Thereby, the brake 7' switches the brake 7' from a fastened state to a released state. Meanwhile, the brake 7' stops the brake drive current flowing in the brake 7', at the time of stopping the gravity axis servomotor 6', to brake the corresponding arm for preventing the corresponding arm from dropping. Thereby, the brake 7' switches the brake 7' from the released state to the fastened state. For such a purpose, the brake 7' includes a brake coil 7a' through which the brake drive current flows.

The rotational position detector 8 is constituted by a rotary encoder that detects a rotational angle θ of the gravity axis servomotor 6, as a position or a speed of the motor. The rotational position detector 8' is constituted by a rotary encoder that detects a rotational angle θ' of the gravity axis servomotor 6', as a position or a speed of the motor.

Current detectors 4U, 4V, and 4W provided at output lines of the inverter 4 detect respective electric currents, i.e., a U-phase current $I_U$, a V-phase current $I_V$, and a W-phase current $I_W$ of the three phases. To control the inverter 4, the inverter controlling device 9 samples, as current value data of the gravity axis servomotor 6, respective electric current values detected by the current detectors 4U, 4V, and 4W. The inverter controlling device 9 samples a rotational angle θ as position-or-speed data of the motor.

The inverter controlling device 9 generates a PWM signal $V_{PWM}$ for driving the gravity axis servomotor 6, on the basis of the sampled current value data, the sampled position-or-speed data, and position-or-speed command data of the motor from an upper control device (not shown in the drawing).

Current detectors 4U', 4V', and 4W' provided at output lines of the inverter 4' detect respective electric currents, i.e., a U-phase current $I_U'$, a V-phase current $I_V'$, and a W-phase current $I_W'$ of the three phases. To control the inverter 4', the inverter controlling device 9' samples, as current value data of the gravity axis servomotor 6', respective electric current values detected by the current detectors 4U', 4V', and 4W'. The inverter controlling device 9' samples a rotational angle θ' as position-or-speed data of the motor.

The inverter controlling device 9' generates a PWM signal $V_{PWM}'$ for driving the gravity axis servomotor 6', on the basis of the sampled current value data, the sampled position-or-speed data, and position-or-speed command data of the motor from the upper control device.

The respective current detectors 4U, 4U', 4V, 4V', 4W, and 4W' are constituted by, for example, Hall elements. The upper control device is constituted, for example, by a computer numerical control (CNC).

The brake drive controlling device 10 controls drive of the brakes 7 and 7'. Specifically, the brake drive controlling device 10 causes brake drive currents to flow through the brake coils 7a and 7a' to switch the brakes 7 and 7' from the fastened states to the released states. For this purpose, the brake drive controlling device 10 includes an NPN type transistor 21 as a first switching device, an NPN type transistor 22 as a second switching device, a diode 23 as a first rectifying device, a diode 24 as a second rectifying device, a voltage detecting unit 25, a voltage controlling unit 26, and diodes 27 and 28 as a third rectifying device.

The NPN type transistor 21 includes a first base, a first emitter, and a first collector. To the first base, a switch command S for causing brake drive currents to flow through the brake coils 7a and 7a' is directly input from the robot controller 11. The first collector is connected to a connection point A at a first electric potential (power supply voltage in this case). The first emitter is connected to one ends of the brake coils 7a and 7a'. Accordingly, inputting a switch command S to the base of the NPN type transistor 21 causes a state of the NPN type transistor 21 to be switched from an off-state to an on-state.

The NPN type transistor 22 includes a second base, a second emitter, and a second collector. To the second base, a switch command S for causing brake drive currents to flow through the brake coils 7a and 7a' is input from the robot controller 11 via the voltage controlling unit 26. The second collector is connected to the other ends of the brake coils 7a and 7a'. The second emitter is connected to a connection point B at a second electric potential (0 [V] in this case). Accordingly, inputting a switch command S to the base of the NPN type transistor 22 causes a state of the NPN type transistor 22 to be switched from an off-state to an on-state.

The diode 23 includes a first anode and a first cathode. The first anode is connected to the other ends of the brake coils 7a and 7a'. The first cathode is connected to one end (positive side) of the smoothing capacitor 3. The diode 24 includes a second anode and a second cathode. The second anode is connected to the other end (negative side) of the smoothing capacitor 3.

The second cathode is connected to the one ends of the brake coils 7a and 7a'.

According to the present embodiment, the diodes 23 and 24 are provided so that energy stored in the brake coils 7a and 7a' when at least one of the NPN type transistor 21 and the NPN type transistor 22 is in the on-state is returned to the smoothing capacitor 3 when the NPN type transistors 21 and 22 are in the off-states. For this reason, when states of the brakes 7 and 7' are switched from the released states to the fastened states, influence of energy stored in the brake coils 7a and 7a' is reduced, and the brakes 7 and 7' can be promptly switched from the released states to the fastened states. In addition, energy stored in the brake coils 7a and 7a' is returned to the smoothing capacitor 3 so that electric power consumption can be reduced.

The voltage detecting unit 25 detects a brake voltage that is being applied to the brake coils 7a and 7a'. For this purpose, the voltage detecting unit 25 includes a non-inverting input unit connected to one ends of the brake coils 7a and 7a', an inverting input unit connected to the other ends of the brake coils 7a and 7a', and an operational amplifier 25a including an output unit connected to the voltage controlling unit 26.

The voltage controlling unit 26 controls the brake voltage such that the brake voltage does not fluctuate in accordance with fluctuation in a voltage of the smoothing capacitor 3. For this purpose, the voltage controlling unit 26 includes an RC filter 26a, a triangular-wave oscillating unit 26b, and a comparator 26c.

The RC filter 26a includes a resistance 26a' and a capacitor 26a". One end of the resistance 26a' is connected to the output unit of the operational amplifier 25a. One end of the capacitor 26a" is connected to the other end of the resistance 26a', and the other end of the capacitor 26a" is connected to a reference electric potential.

The triangular-wave oscillator 26b includes an input unit to which a switch command S is input, and an output unit that outputs a triangular wave generated in response to the switch command S. The comparator 26c includes an inverting input unit connected to the other end of the resistance 26a' and the one end of the capacitor 26a", a non-inverting input unit connected to the output unit of the triangular-wave oscillator 26b, and an output unit connected to a gate of the NPN type transistor 22.

Figure 2:
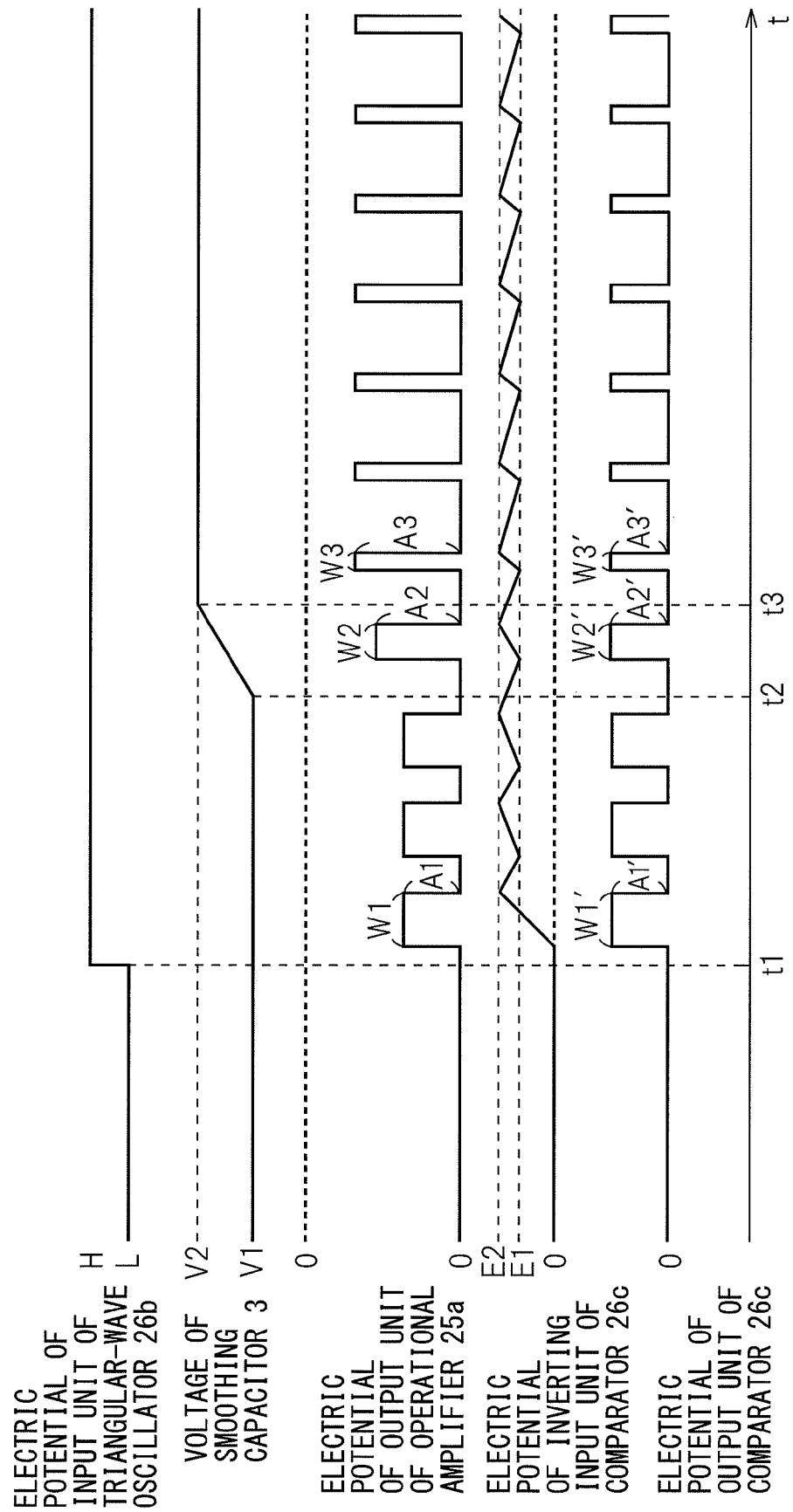
FIG. 2 illustrates operation of a voltage controlling unit of FIG. 1.

FIG. 2 illustrates operation of the voltage controlling unit of FIG. 1. At the time t1 when a voltage of the smoothing capacitor 3 is a value V1, the robot controller 11 outputs the switch command S. Thereby, at the time t1, an electric potential at the input unit of the triangular-wave oscillator 26b is switched from a low (L) level to a high (H) level. The output unit of the operational amplifier 25a intermittently generates a pulse having a width W1 and amplitude A1 in the period from the time t1 to the time t2. In this period, a voltage of the smoothing capacitor 3 is maintained at the value V1. The output unit of the comparator 26c intermittently generates a pulse having a width W1' and amplitude A1' in the period from the time t1 to the time t2.

While the robot controller 11 outputs the switch command S, a voltage at the smoothing capacitor 3 fluctuates from the value V1 to a value V2 over the period from the time t2 (t2>t1) to the time t3 (t3>t2). As a result, the output unit of the operational amplifier 25a intermittently generates a pulse having a width W2 (W2<W1) and amplitude A2 (A2>A1). The output unit of the comparator 26c intermittently generates a pulse having a width W2' (W2'<W1') and amplitude A2' (A2'>A1').

At and after the time t3, while the robot controller 11 continues to output the switch command S, a voltage of the smoothing capacitor is maintained at the value V2. In this period, the output unit of the operational amplifier 25a intermittently generates a pulse having a width W3 (W3<W2) and amplitude A3 (A3>A2). The output unit of the comparator 26c generates a pulse having a width W3' (W3'<W2') and amplitude A3' (A3'>A2').

It is assumed that the brake drive controlling device 10 does not include the voltage detecting unit 25 and the voltage controlling unit 26. In this case, a voltage (brake voltage) between the both ends of the brake coil 7a or the brake coil 7a' fluctuates in accordance with fluctuation in a voltage of the smoothing capacitor 3. On the contrary, according to the present embodiment, the brake drive controlling device 10 includes the voltage detecting unit 25 and the voltage controlling unit 26. Accordingly, as illustrated in FIG. 2, an electric potential (corresponding to the brake voltage) at the inverting input unit of the comparator 26c at and after a falling edge of the first pulse linearly changes between an electric potential E1 and an electric potential E2 (E2>E1). Such linear change in an electric potential of the inverting input unit of the comparator 26c means that the brake voltage does not fluctuate even when a voltage of the smoothing capacitor 3 fluctuates from the value V1 to the value V2. Consequently, by the voltage detecting unit 25 and the voltage controlling unit 26, it is possible to reduce fluctuation in the brake voltage that is caused by fluctuation in a voltage of the smoothing capacitor 3 when the brakes 7 and 7' are switched from the released states to the fastened states. As a result, the brakes 7 and 7' can be promptly switched from the released states to the fastened states.

The diodes 27 and 28 prevent a flow of energy between the brake coil 7a and the brake coil 7a'. This flow is caused by a difference in counter electromotive force between the brake coil 7a and the brake coil 7a'. Accordingly, even when counter electromotive force of the brake coil 7a is different from counter electromotive force of the brake coil 7a', energy stored in the brake coils 7a and 7a' when at least one of the NPN type transistors 21 and 22 is in the on-state can be returned to the smoothing capacitor 3 when the NPN type transistors 21 and 22 are in the off-states.

The present invention is not limited to the above-described embodiment, and various alterations and modifications can be made. For example, the brake drive controlling device according to the present invention may be applied to a system using a gravity axis servomotor or the like in a machine tool or the like.

In the above-described embodiment, the case of using the three-phase AC power supply 1 as an AC power supply is described. However, a polyphase AC power supply other than a three-phase AC power supply may be used as an AC power supply. Further, the rotational position detector 8 may be constituted by a component (for example, a Hall element or a resolver) other than a rotary encoder. Further, instead of detecting all of a U-phase current, a V-phase current, and a W-phase current, only electric currents (for example, a U-phase current and a V-phase current) of two phases among a U-phase current, a V-phase current, and a W-phase current may be detected.

In the above-described embodiment, the case of using the NPN type transistors as a first switching device and a second switching device is described. However, the present invention is not limited to this manner. In other words, PNP type transistors, field effect transistors (FETs), insulation gate bipolar transistors (IGBTs), relays, or the like may be used as the first switching device and the second switching device.

Furthermore, in the above-described embodiment, the case in which the voltage detecting unit 25 includes the operational amplifier 25a is described. However, the voltage detecting unit 25 may be constituted by a photocoupler or the like. In the above-described embodiment, the voltage detecting unit 25 and the voltage controlling unit 26, or the diodes 27 and 28 may be omitted, or the voltage detecting unit 25 and the voltage controlling unit 26, and the diodes 27 and 28 may be omitted. Further, in the above-described embodiment, the case of controlling drive of the two brakes 6 and 6' is described. However, the present invention can be applied to the case of controlling one, or three or more brakes.

What is claimed is:
1. A brake drive controlling device that controls drive of a brake by electric power stored in a DC link unit connected to an AC power supply via a converter, for switching the brake from a released state to a fastened state by stopping a brake drive current flowing in the brake that brakes a driven body driven in a gravity axis direction by a motor, the brake drive controlling device comprising:
   a first switching device that is connected to one end of the brake wherein a switch command is input to the first switching device so that a state of the first switching device is switched from an off-state to an on-state to cause a brake drive current to flow in the brake;

a second switching device that is connected to the other end of the brake wherein the switch command is input to the second switching device so that a state of the second switching device is switched from an off-state to an on-state to cause a brake drive current to flow in the brake;

a first rectifying device, one end being connected to the other end of the brake, and the other end being connected to one end of the DC link unit; and a second rectifying device, one end being connected to the other end of the DC link unit, and the other end being connected to the one end of the brake; and a third device that prevents a flow of energy between the brake and at least one different brake that are connected in parallel with each other, wherein the flow is caused by a difference in counter electromotive force between the brake and the at least one different brake, wherein when the first switching device and the second switching device are in the off-states, at least either the first rectifying device or the second rectifying device returns, to the DC link unit, energy that is stored in the brake when at least either the first switching device or the second switching device is in the on-state.

2. A brake drive controlling device that controls drive of a brake by electric power stored in a DC link unit connected to an AC power supply via a converter, for switching the brake from a released state to a fastened state by stopping a brake drive current flowing in the brake that brakes a driven body driven in a gravity axis direction by a motor, the brake drive controlling device comprising;

a first switching device that is connected to one end of the brake wherein a switch command is input to the first switching device so that a state of the first switching device is switched from an off-state to an on-state to cause a brake drive current to flow in the brake;

a second switching device that is connected to the other end of the brake wherein the switch command is input to the second switching device so that a state of the second switching device is switched from an off-state to an on-state to cause a brake drive current to flow in the brake;

a first rectifying device, one end being connected to the other end of the brake, and the other end being connected to one end of the DC link unit;

a second rectifying device, one end being connected to the other end of the DC link unit, and the other end being connected to the one end of the brake;

a voltage detecting unit for detecting a brake voltage that is being applied to the brake;

a voltage controlling unit for controlling the brake voltage such that the brake voltage does not fluctuate in accordance with fluctuation in a voltage of the DC link unit; and a third rectifying device that prevents a flow of energy between the brake and at least one different brake that are connected in parallel with each other, wherein the flow is caused by a difference in counter electromotive force between the brake and the at least one different brake, wherein when the first switching device and the second switching device are in the off-states, at least either the first rectifying device or the second rectifying device returns, to the DC link unit, energy that is stored in the brake when at least either the first switching device or the second switching device is in the on-state.

* * * * *